United States Patent [19]
Adsit

[11] 4,386,582
[45] Jun. 7, 1983

[54] LIQUID STORAGE CONTAINER HAVING ANIMAL FEEDING MEANS

[76] Inventor: Gordon H. Adsit, Hwy. 60, One Mile West, Lake Wales, Fla. 33853

[21] Appl. No.: 259,844

[22] Filed: May 4, 1981

[51] Int. Cl.³ .............................................. A01K 5/00
[52] U.S. Cl. ..................................... 119/51 R; 119/63
[58] Field of Search ...................... 119/51 R, 51.5, 53, 119/63, 72, 75; 222/403

[56] References Cited

U.S. PATENT DOCUMENTS

| | | | |
|---|---|---|---|
| 954,371 | 4/1910 | Ardizone | 222/403 |
| 1,814,776 | 7/1931 | Waugh | 222/403 |
| 3,459,159 | 8/1969 | Reed | 119/51 R |
| 3,734,060 | 5/1973 | Collison | 119/51 R |
| 3,901,191 | 8/1975 | Smith | 119/51 R |
| 3,946,703 | 3/1976 | Wheat | 119/51 R X |

FOREIGN PATENT DOCUMENTS 2384449 10/1978 France .............................. 119/51 R Primary Examiner—Robert P. Swiatek
Attorney, Agent, or Firm—Duckworth, Allen, Dyer & Pettis

[57] ABSTRACT

An animal feeder for cattle, horses, and the like has an opening along the peripheral wall, and a buoyant feeder wheel extending through the opening. A molding about the opening positions the wheel with a first portion extended through the opening and the remainder extending into the liquid feeder, the wheel being supported free of any mechanical connection to the housing to permit vertical movement responsive to pressure from feeding animals.

16 Claims, 4 Drawing Figures

LIQUID STORAGE CONTAINER HAVING
ANIMAL FEEDING MEANS

BACKGROUND OF THE INVENTION

1. Field of the Invention

The present invention relates to liquid feed dispensers for cattle, horses and other animals.

2. Description of the Prior Art

The prior art discloses a number of liquid feeding dispensers, each comprising a housing having a slotted opening, with a feeding wheel positioned in the opening and adapted to be rotated responsive to movement by an animal. The rotating wheel passes through a liquid feed stored in the container, and is thereby presented to the animal outside the container as a result of the rotation. See, for example, the following U.S. Patents:

| U.S. Pat. Nos. | 338,761 | 1,190,028 |
|---|---|---|
| | 2,158,093 | 2,293,643 |
| | 2,651,291 | 3,459,159 |
| | 3,802,394 | 3,952,705 |

Arrangements like those described above employ a feeding wheel which is supported in the housing on an axle mounted horizontally in the housing.

During feeding, a cow may rotate the wheel by movement of its tongue across the top of the wheel. More frequently, however, the cow will effect rotation with pressure from its chin. When this is done, a significant amount of pressure is applied to the axle. One of the greatest difficulties in the past with such arrangements has been the breaking of the axle responsive to this constant pressure from cattle.

One attempt to resolve this problem employs an axle made of a high tensile strength metal. Because of the caustic nature of the liquid feeds typically used in such arrangements, it has been found that only stainless is suitable. However, the use of stainless steel for such an axle greatly increases the cost of such an arrangement. Additionally, liquid feeds typically used with such arrangements are highly abrasive, and tend to quickly wear even the stainless steel axles.

SUMMARY OF THE INVENTION

The present invention contemplates a liquid feed dispenser for cattle, horses and other animals, comprising a housing defined by an outer, peripheral wall forming a liquid storage chamber which has an opening along its peripheral wall. The dispenser includes ingress means for permitting access to the chamber for filling with a liquid feed, and a feeding wheel which is buoyant in the liquid feed stored in the chamber. Means are providing for positioning the wheel with a first portion extending through the opening, and the remainder extending into the liquid feed within the chamber. The wheel is supported relatively free of any mechanical connection to the housing, to permit movement responsive to pressure from feeding animals.

In a preferred embodiment of the present invention, the means positioning the wheel in the opening includes a pair of retainers molded into the housing adjacent the bottom, which retainers defined a space therebetween. The bottom of the wheel is aligned in that space, and is further aligned with the opening in the peripheral wall of the housing. The buoyancy of the wheel permits it to float in the liquid, and thereby be suspended a short distance above the bottom of the housing, between the two retainers. Because the wheel is free of any direct mechanical connection to the housing, it is free for vertical movement responsive to pressure from feeding animals, thereby avoiding the previous difficulties with mechanically connected feeding wheels, as described above. The resulting feeding wheel arrangement has a longer useful life and is relatively inexpensive compared to prior art arrangements.

DETAILED DESCRIPTION

Figure 1:
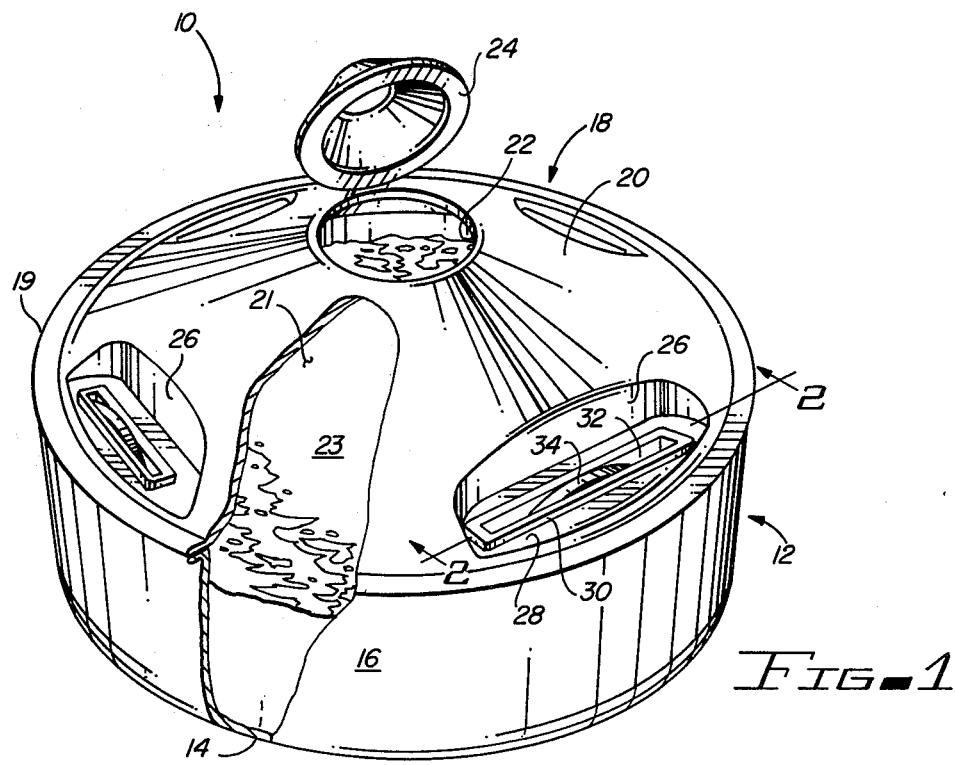
FIG. 1 is a perspective view, partially cut away, illustrating the liquid feed dispenser of the present invention.

A detailed description of the preferred embodiment of the liquid feed dispenser of the present invention will now be described with reference to FIGS. 1, 2 and 3.

The dispenser, referred to generally by the reference numeral 10, includes a bottom portion 12 defined by a flat bottom wall 14 and a generally cylindrical side wall 16. The dispenser 10 further includes a top portion 18 defined by a generally conical wall 20 joined to the cylindrical side wall 16 of the bottom 14 at a seam 19. The conical wall includes a hole 22 at the upper extremity thereof, forming an ingress to permit cleaning and filling of the dispenser 10.

The top and bottom portions 18, 12, respectively, of the dispenser 10 thus define a storage chamber 21 for a liquid feed 23. Typically, the liquid feed has a high acid and sugar content and is therefore extremely caustic. Accordingly, it is preferred that the bottom and top portions 14, 18 to be formed of a high impact plastic material capable of withstanding extreme weather conditions over a long period of time. For example, a cross-linked polyethylene which has been stabilized for ultraviolet radiation is suitable.

A cover 24 is positioned over the hole 22.

The dispenser 10 is provided with a plurality of indentations 26, preferably four such indentations, spaced equally around the conical wall 20, each indentation being along the bottom of the conical wall near the seam 19. Each indentation 26 includes a substantially horizontal flat surface 28. Each indentation 26 further includes an integral molding 30 extending above the level of the horizontal flat surface 28, and defining a slot 32 therein. Preferably, the longitudinal dimension of the slot 32 is substantially less than the diameter of the liquid feeding wheel 34, described in greater detail below.

Figure 2:
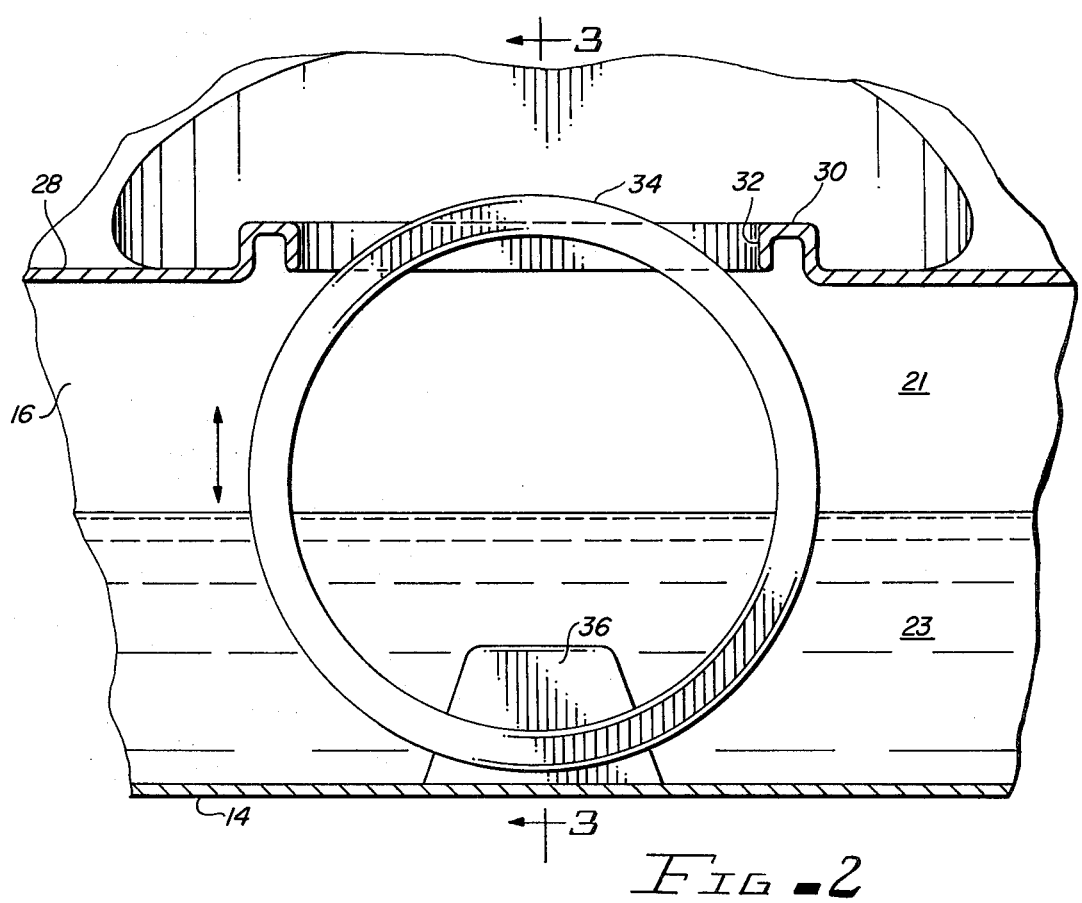
FIG. 2 is a front elevation of a portion of the dispenser shown in FIG. 1, taken along the line 2—2 in FIG. 1.
Figure 3:
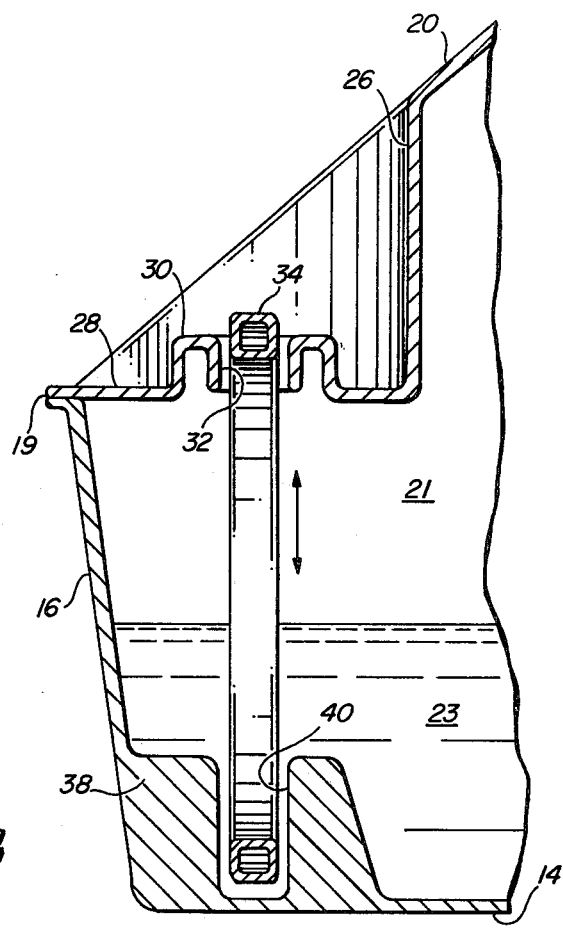
FIG. 3 is a cross-section of a portion of the dispenser shown in FIG. 1, taken along the line 3—3 of FIG. 2.

With specific reference to FIGS. 2 and 3, the dispenser 10 is further provided with a pair of retainers 36, 38 integrally molded into the bottom and side walls 14, 16 of the bottom portion 12. The retainers 36, 38 define a vertical space 40 in substantial alignment with the slot 32 in the molding 30. The liquid feed wheel 34 is positioned in the slot 32 and space 40, and is completely free of any mechanical connection to the dispenser 10 or any portion thereof.

The feeding wheel 34 is formed in the shape of an annular ring, and is preferably hollow to facilitate its buoyancy in the liquid feed 23 within the chamber 21. That buoyancy permits the wheel to float with the liquid, and to move slightly upward and downward responsive to changes in the level of the liquid 23. As is shown in FIG. 2, the longitudinal dimension of the slot 32 is substantially less than the diameter of the annular ring which forms the feeding wheel 34. In this way, the slot 32 serves as a "stop" for upward vertical movement, and likewise, the bottom wall 14 in the space 40 at the bottom serves as a "stop" for the vertical movement of the annular feeding wheel 34. Typically, the wheel 34 extends about one inch above the molding 30 when in the uppermost position.

It will be appreciated by those skilled in the art that cattle feeding from the dispenser 10 may apply pressure to the feeding wheel 34, causing the wheel to move slightly into the chamber 21; simultaneous rotation of the wheel picks up liquid feed 23, which is then presented to the animal above the slot 32. There being no direct mechanical connection between the feeding wheel 34 and the dispenser 10, the pressure from the animal does not break such mechanical connection.

Figure 4:
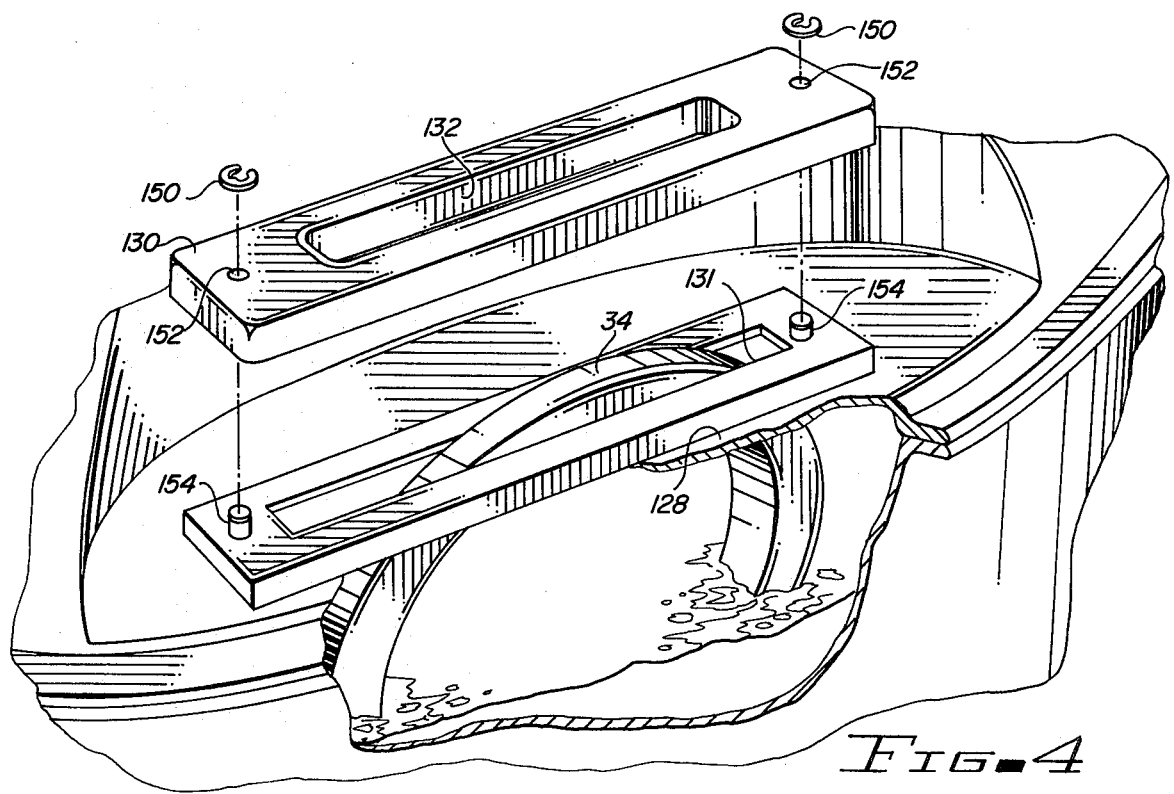
FIG. 4 illustrates an alternative embodiment with respect to a portion of the dispenser shown in FIGS. 1, 2 and 3.

An alternative embodiment of the dispenser is shown in FIG. 4. The arrangement of FIG. 4 is substantially identical to that of FIGS. 1-3, except that the integral molding 30 (FIG. 3) is replaced by a removable bracket to permit easy removal of the feeding wheel 34.

Noting FIG. 4, a flat surface 128 in the indentation 26 (FIG. 1) includes an oversize opening 131 having a longitudinal dimension which is greater than the diameter of the wheel, permitting the wheel to be removed through that opening. A bracket 130 having a length and width dimension sufficient to cover the opening 131 is provided, with posts 154 adapted to extend through holes 152 and be held by clips 150. The bracket 130 includes a slot 132 substantially identical in dimension and function to the slot 32 in the arrangement shown in FIG. 3. It will be appreciated that the bracket 130 is easily removable to permit the wheel 34 to be lifted out of the dispenser 10.

I claim:

1. A liquid feed dispenser for cattle, horses and other animals comprising:
    (a) a housing defined by an outer peripheral wall forming a liquid storage chamber and having a slot along said peripheral wall;
    (b) ingress means for permitting said chamber to be filled with a liquid feed;
    (c) a feeding wheel which is buoyant in the liquid to be stored in said chamber, said wheel comprising an annular ring free of mechanical connection to said housing;
    (d) means for positioning said wheel with a first portion extending through said slot and the remainder extending into the liquid feed within said chamber, said wheel being supported relatively free for movement responsive to pressure from feeding animals; and where
    (e) cattle, horses and other animals to be fed may obtain the liquid feed from said chamber by rotating said portion of said wheel in said slot, causing liquid feed to be presented along said wheel for consumption.

2. The liquid feed dispenser recited in claim 1 wherein said positioning means includes the periphery of said slot.

3. The liquid feed dispenser recited in claim 2 wherein the periphery of said slot comprises a molding extending above the level of said peripheral wall around said slot, whereby the amount of rainfall or other extraneous matter entering said housing through said slot may be reduced.

4. The liquid feed dispenser recited in claim 3 wherein said molding is integrally molded with said peripheral wall.

5. The liquid feed dispenser recited in claim 3 wherein said molding comprises a removable bracket, and further comprising fastening means for supporting said bracket around said slot.

6. The liquid feed dispenser recited in claim 2 wherein said positioning means further comprises a retainer in said chamber for positioning said ring in substantial alignment with said slot.

7. The liquid feed dispenser recited in claim 1 wherein said outer peripheral wall defines a bottom portion having a generally vertical side wall and a top portion having a generally conical configuration.

8. The liquid feed dispenser recited in claim 7 further comprising an indentation along said top portion adjacent the intersection with said bottom portion, said slot extending through said indentation.

9. The liquid feed dispenser recited in claim 7 wherein said ingress means comprises a hole at the upper extremity of said top portion, and further comprising a removable cover over said hole.

10. The liquid feed dispenser recited in claim 1 wherein said slot comprises a rectangular opening, the longitudinal dimension of which is less than the diameter of said feeding wheel.

11. A liquid feed dispenser for cattle, horses and other animals comprising:
    (a) a housing defined by an outer peripheral wall forming a liquid storage chamber and having a slot along said peripheral wall;
    (b) a molding about the periphery of said slot and extending above the level of said peripheral wall around said slot, whereby the amount of rainfall or other extraneous matter entering said housing through said opening may be reduced;
    (c) an annular ring which is buoyant in the liquid feed stored in said chamber, the diameter of said ring being greater than the longitudinal dimension of said slot;
    (d) means including the periphery of said slot for positioning said ring with the diameter thereof substantially parallel with the longitudinal dimension of said slot, and with a first portion extending through said slot and the remaining portion extending into the liquid feed within said chamber, said ring being supported relatively free of movement responsive to pressure from feeding animals;
    (e) said peripheral wall including a bottom, said positioning means further comprising a retainer molded into said bottom for positioning said ring in substantial alignment with said slot during relative vertical movement of said ring responsive to pressure from feeding animals and changes in the level of liquid feed in said chamber; and wherein
    (f) cattle, horses and other animals to be fed may obtain the liquid feed from said chamber by rotating said portion of said ring in said slot, causing liquid feed to be presented along said ring for consumption.

12. The liquid feed dispenser recited in claim 11 wherein said ring is positioned with a majority of its periphery in said chamber, whereby an imaginary line in the plane of said molding cuts a chord through said ring.

13. The liquid feed dispenser recited in claim 11 wherein the outer peripheral wall defines a bottom portion having a generally vertical side wall and a top portion having a generally conical configuration.

14. The liquid feed dispenser recited in claim 13 further comprising an indentation along said top portion adjacent the intersection with said bottom portion, said slot extending through said indentation.

15. A liquid feed dispenser for cattle, horses and other animals comprising:
 (a) a housing having a peripheral wall forming a generally cylindrical base portion and a generally conical top portion with an indentation adjacent the intersection of said base and top portions, said wall defining a liquid storage chamber for a liquid feed for cattle, horses or other animals;
 (b) said base portion including opposing retainers with a space between said retainers, said top portion including a slot in said indentation and having a molding across that slot, said slot in substantial alignment with said space between said retainers;
 (c) a feeding wheel which is buoyant in the liquid feed stored in said chamber, said wheel positioned free of any mechanical connection in said space between said retainers and with a portion thereof extending through said slot, the diameter of said wheel being greater than the longitudinal dimension of said slot, said wheel being relatively free for limited movement away from said slot responsive to pressure from feeding animals; and wherein
 (d) cattle, horses and other animals to be fed may obtain the liquid feed from said chamber by rotating said portion of said wheel in said opening, causing liquid feed to be presented along said wheel for consumption.

16. The liquid feed dispenser recited in claim 15 wherein said top portion comprises a hole at the top thereof to permit access to said storage chamber for cleaning and filling.

* * * * *